UNITED STATES PATENT OFFICE.

BENJAMIN F. AIKEN, JR., OF MILLBURY, AND CHARLES W. NEWHALL, JR., AND GEORGE W. B. ELLIS, OF WORCESTER, MASSACHUSETTS.

WIRE-COATING PREPARATORY TO DRAWING.

SPECIFICATION forming part of Letters Patent No. 298,051, dated May 6, 1884.

Application filed July 13, 1883. (No specimens.)

*To all whom it may concern:*

Be it known that we, BENJAMIN F. AIKEN, Jr., of Millbury, and CHARLES W. NEWHALL, Jr., and GEORGE W. B. ELLIS, both of Worcester, all in the county of Worcester and State of Massachusetts, citizens of the United States, have invented a new and useful Improvement in a Wire Coating or Bath as a Lubricant for the Wire in the Process of Drawing, as hereinafter set forth.

Our present invention is an improvement upon the wire-coating described in our application for Letters Patent filed April 6, 1883, Serial No. 90,889; and it consists in immersing the wire or rods to be drawn in a bath containing flour or meal prepared in the same manner as the flour coating now in common use, and to which dextrine and alum have been added, in the proportion of from one to two pounds of dextrine and from one-tenth to two-tenths of an ounce of alum to each one hundred pounds of flour, adding water to reduce it to the proper consistency, and applying heat in the manner employed in the preparation of the ordinary flour bath, further reducing the thickness of the bath by the addition of lime-water, if desired. By the use of dextrine and alum as ingredients in the flour bath we are able to produce a coating superior to that formed of flour alone, or of flour and dextrine, or of flour and alum. A much poorer grade of flour may be used, or a bath of part flour and part middlings instead of flour wholly, thus effecting a great saving in cost. The coating formed by the above-described process flows more evenly over the surface of the wire; "sets" sooner, and therefore does not run to the under side of the wire in drying; it adheres more firmly, and produces a much better lubrication of the wire. By the addition of a small quantity of alum a much less quantity of dextrine is required than when flour and dextrine alone are used, producing equally good results. The proportions of the several ingredients above named are those employed for the grades of flour generally used for the purpose of coating wire, and may be advantageously varied somewhat with different grades of flour or when flour and middlings are used. Such variation, however, will be readily determined by those familiar with the process of coating wire with flour. A very desirable coating may also be made by adding alum to the ordinary flour bath. Such a coating we have described and claimed in a separate application for Letters Patent.

What we now claim as our invention, and desire to secure by Letters Patent, is—

The improved wire coating or bath consisting of a solution of dextrine and alum and flour or meal, as and for the purpose set forth.

Witness our hands this 7th day of July, A. D. 1883.

B. F. AIKEN, JR.
  CHAS. W. NEWHALL, JR.
  GEO. W. B. ELLIS.

Witnesses:
 S. B. I. GODDARD,
 R. B. FOWLER.